(12) United States Patent
Hynönen et al.

(10) Patent No.: US 8,139,560 B2
(45) Date of Patent: Mar. 20, 2012

(54) INTELLIGENT MULTIMEDIA CALLS

(75) Inventors: Olli Matti Hynönen, Espoo (FI); Keijo Tapio Laiho, Masala (FI); Anders Wannfors, Bromma (SE); Kimmo Rantanen, Vantaa (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1463 days.

(21) Appl. No.: 10/573,040

(22) PCT Filed: Sep. 14, 2004

(86) PCT No.: PCT/EP2004/052168
§ 371 (c)(1),
(2), (4) Date: Jan. 18, 2007

(87) PCT Pub. No.: WO2005/032164
PCT Pub. Date: Apr. 7, 2005

(65) Prior Publication Data
US 2007/0165598 A1 Jul. 19, 2007

(30) Foreign Application Priority Data
Sep. 27, 2003 (GB) ................................. 0322711.3

(51) Int. Cl.
*H04L 12/66* (2006.01)
(52) U.S. Cl. ...................................................... 370/352
(58) Field of Classification Search .................. 370/395, 370/353, 401; 725/109, 110, 127; 379/112, 379/114, 122, 221, 269, 327
See application file for complete search history.

(56) References Cited

U.S. PATENT DOCUMENTS

| | | | | |
|---|---|---|---|---|
| 4,636,584 A | * | 1/1987 | Binkerd et al. | 379/240 |
| 5,177,785 A | * | 1/1993 | Itani et al. | 380/253 |
| 5,666,357 A | * | 9/1997 | Jangi | 370/345 |
| 5,790,173 A | * | 8/1998 | Strauss et al. | 725/114 |
| 5,999,985 A | * | 12/1999 | Sebestyen | 709/247 |
| 6,124,882 A | * | 9/2000 | Voois et al. | 348/14.08 |
| 6,259,691 B1 | * | 7/2001 | Naudus | 370/352 |
| 6,487,196 B1 | * | 11/2002 | Verthein et al. | 370/352 |
| 6,580,906 B2 | * | 6/2003 | Bilgic et al. | 455/422.1 |
| 6,909,708 B1 | * | 6/2005 | Krishnaswamy et al. | 370/352 |
| 7,145,898 B1 | * | 12/2006 | Elliott | 370/352 |
| 7,532,606 B2 | * | 5/2009 | Suzuki et al. | 370/338 |
| 2001/0005382 A1 | * | 6/2001 | Cave et al. | 370/466 |

(Continued)

FOREIGN PATENT DOCUMENTS
WO WO 00/24184 A1 4/2000

OTHER PUBLICATIONS

Anderson J and Wirde J: "3G-324M Video Client/server" Master of Science Thesis, KTH Department of Teleinformatics, 'Online! Jan. 25, 2001.

(Continued)

*Primary Examiner* — Hassan Phillips
*Assistant Examiner* — Prenell P Jones

(57) ABSTRACT

A method of setting up and/or controlling a multimedia call involving an H.324 enabled user terminal and a circuit switched connection terminating at the user terminal and at a video gateway, the method comprising: sending DTMF control signals over the circuit switched connection within H.245 protocol control messages; and on the basis of said DTMF control signals, routing or re-routing the connection to an appropriate data source or mapping the connection to an appropriate data source.

14 Claims, 7 Drawing Sheets

U.S. PATENT DOCUMENTS

| | | | |
|---|---|---|---|
| 2002/0029350 A1* | 3/2002 | Cooper et al. | 713/200 |
| 2002/0064149 A1* | 5/2002 | Elliott et al. | 370/352 |
| 2003/0125952 A1* | 7/2003 | Engelke et al. | 704/260 |
| 2004/0100912 A1* | 5/2004 | Miao et al. | 370/252 |
| 2005/0009519 A1* | 1/2005 | Murai et al. | 455/432.2 |
| 2005/0071109 A1* | 3/2005 | DeFelice et al. | 702/120 |
| 2009/0175427 A1* | 7/2009 | Raniere et al. | 379/93.21 |

OTHER PUBLICATIONS

"Terminal for low bit-rate communication" ITU-T Recommendation H 323, Mar. 2002, XP002315314.

* cited by examiner

INTELLIGENT MULTIMEDIA CALLS

FIELD OF THE INVENTION

The present invention relates to the provision of intelligent multimedia calls and in particular, though not necessarily, to the provision of intelligent video calls to user terminals making use of circuit switched access networks.

BACKGROUND TO THE INVENTION

In the following text, reference is made to certain protocols defined by the International Telecommunications Union (ITU), namely:

| Protocol name | Protocol Description |
|---|---|
| H.324 | Terminal for low bit-rate multimedia communication |
| H.223 | Multiplexing protocol for low bit rate multimedia communication |
| H.245 | Control protocol for multimedia communication |
| H.323 | Packet-based multimedia communications systems |
| H.248 | Gateway Control Protocol |

There exist many services implemented over circuit switched (CS) access networks with the help of so-called Intelligent Network (IN) nodes. These services are utilized mainly with voice bearers in the CS network. The reason for this is that the devices which are utilized by IN-based services have tended to support only pure voice. There exist however multimedia protocols which are capable of utilizing the CS bearers, e.g ITU-T H.324. Implementations of these protocols can be used for pure video telephony between users which communicate with each other interactively.

A number of deficiencies of existing implementations mean that IN services cannot be used efficiently with H.324 video calls.

Many IN services used for voice calls provide for announcements and prompts to calling subscribers to allow access to and selection of services by means of Dual Tone Multi-Frequency (DTMF) digits. The narrowband multimedia protocol H.324 uses an unrestricted 64 kbit/s digital bearer in 3G-324M applications as seen by the IN-nodes. The content of the 64 kbit/s bearer includes audio, video and control streams multiplexed using the H.223 protocol (Multiplex protocol for low bit rate multimedia communication). The voice announcements played by IN-services are typically stored in PCM coding format. Since the prior art IN-solutions do not include the capability to manipulate the content of unrestricted 64 kbit/s digital calls, IN services do not have the possibility to play announcements for 3G-324M calls.

3G-324M uses efficient audio codecs, e.g. AMR (advanced multi rate) and G.723. These codecs are not capable of transferring the DTMF tones reliably. Thus the DTMF tones are transferred in H.324 by means of control messages, i.e. the H.245 userInputIndication message. Since the prior art IN-solutions do not include the capability to detect the content of unrestricted 64 kbit/s digital calls, IN services do not have the possibility to listen the DTMF tones for 3G-324M calls.

SUMMARY OF THE INVENTION

According to an aspect of the present invention there is provided a method of setting up and/or controlling a multimedia call involving an H.324 enabled user terminal and a circuit switched connection terminating at the user terminal and at a network node, the method comprising:

sending DTMF control signals over the circuit switched connection within H.245 protocol control messages; and on the basis of said DTMF control signals, routing or re-routing the connection to an appropriate data source or mapping the connection to an appropriate data source.

Other aspects of the present invention are set out in the appended claims.

DETAILED DESCRIPTION OF PREFERRED EMBODIMENTS

Figure 1:
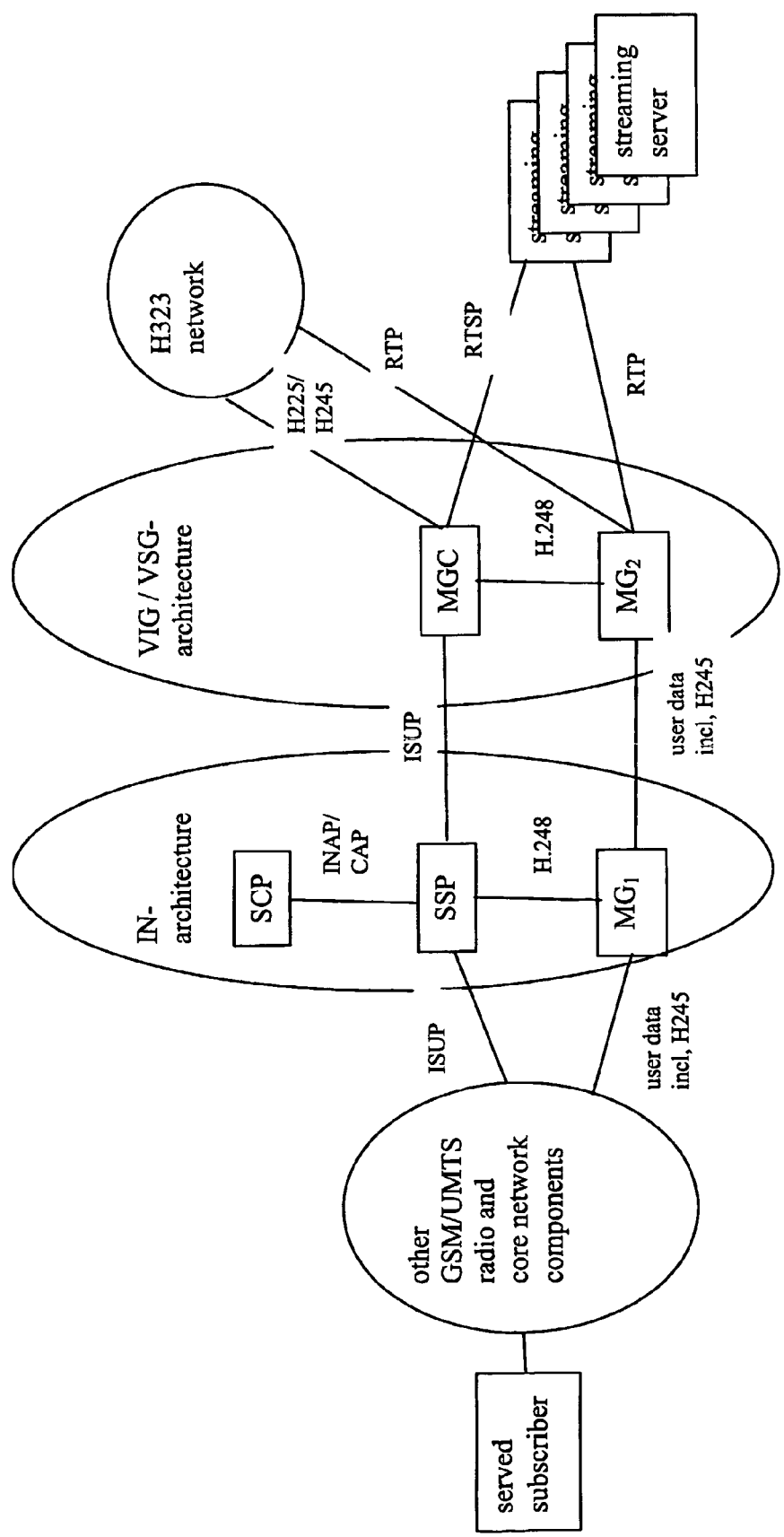
FIG. 1 illustrates an architecture for providing multimedia services to users.

FIG. 1 illustrates a network architecture for providing video interactive services to subscribers of a mobile telecommunications service. Subscriber terminals are assumed to be terminals using the H.324 protocol for setting up and controlling multimedia communication sessions. Subscribers access the service via a GSM or UMTS circuit switched access network. Control plane signalling is carried according to the ISUP protocol.

In order to set up a multimedia session, a subscriber places a call to an IN node. The IN node comprises a Service Control Point (SCP) and a Service Switching Point (SSP), as well as a Media Gateway (MG). The Media Gateway is illustrated in more detail in FIG. 2. The SSP recognises a multimedia session setup request, and suspends set-up of the session, whilst routing information is obtained from the SCP. Calls are then directed to a Video Gateway as will be described further below, and further directed by the Video Gateway to either an H.323 network or to a packet switched server (e.g. a streaming server). The video gateway comprises a Media Gateway and a Media Gateway Controller.

The video gateway concept is introduced to make it possible to connect circuit switched (CS) based multimedia services to packet switched (PS) based multimedia services, e.g. enabling a video call from a CS based terminal implementing the H.324 protocol to a PS based terminal implementing the H.323/SIP protocol. This video gateway is referred to as a "video interactive gateway". Currently the video gateway is known to also contain video streaming gateway (VSG) capabilities enabling a CS based terminal to connect to PS based servers. In this case, the VSG interworks between for example ISUP+H.245 and RTSP (real time streaming protocol) on the control plane, and between TDM and IP/RTP on the user plane.

Since this configuration uses normal CS bearers, e.g. 64 kbit/s unrestricted and normal CS control protocols (ISUP), it can be easily integrated with IN-services as illustrated in FIG. 1. The IN services platform contains capabilities to route CS calls based on various parameters, e.g. calling party location and current time. This allows called party number modifications based on these parameters. Thus the IN can forward a CS call to the VSG on the basis of various called party numbers. The VSG maps these numbers to URLs, which represent different resources, e.g. video clips provided by streaming servers. This makes it possible to provide services such as the local weather forecast using video and audio media (e.g. based on caller's location).

The IN services platform may contain functionality to itself initiate (without prompting) calls to one party or to several parties. This may happen for example based on time, subscriber movements, etc. Thus the IN node can make a connection between the served subscriber and a streaming server by the means described in the preceding paragraph. This makes it possible to provide push services such as wake-up calls providing business news, and advertisement videos when the served subscriber approaches a shop/restaurant.

The IN service logic residing in the SSP receives information about the nature of a call, e.g. a 3G-324M call, from the SCP with the help of ISUP and INAP/CAP (intelligent network application part/CAMEL application part) signalling. This information is used by the IN service logic to select video clips at a streaming server instead of voice announcements played by SSP/MG1. Thus the VSG is seen by the IN as an intelligent peripheral (IP). The prior art IN implementation is enhanced with the H.223 de-multiplexing and multiplexing function in $MG_1$. The H.248 gateway control protocol already includes packages to detect H.245 messages and pass information to the MGC. This enables the IN service logic in the SSP to receive DTMF digits received in H.245 UII messages in MG1. The received DTMF digits are used by the IN service to trigger appropriate actions in the service logic. This may include routing the call to different destinations, e.g. to normal video telephones or video streaming servers.

These tools allow IN-technology to create services and service groups, which can be illustrated to a user with the help of visual information. For example, the user can use the normal terminal keypad to change to another video clip/live video camera view whilst watching another video clip. The first video clip may contain audio-visual instructions about the availability of the other video clips. The selection of the appropriate video is controlled by the IN-service by rerouting the call to another destination. This may involve usage of other service triggers, e.g. calling party location (to select e.g. the nearest camera) or calling party id (to select e.g. the right language).

Figure 2:
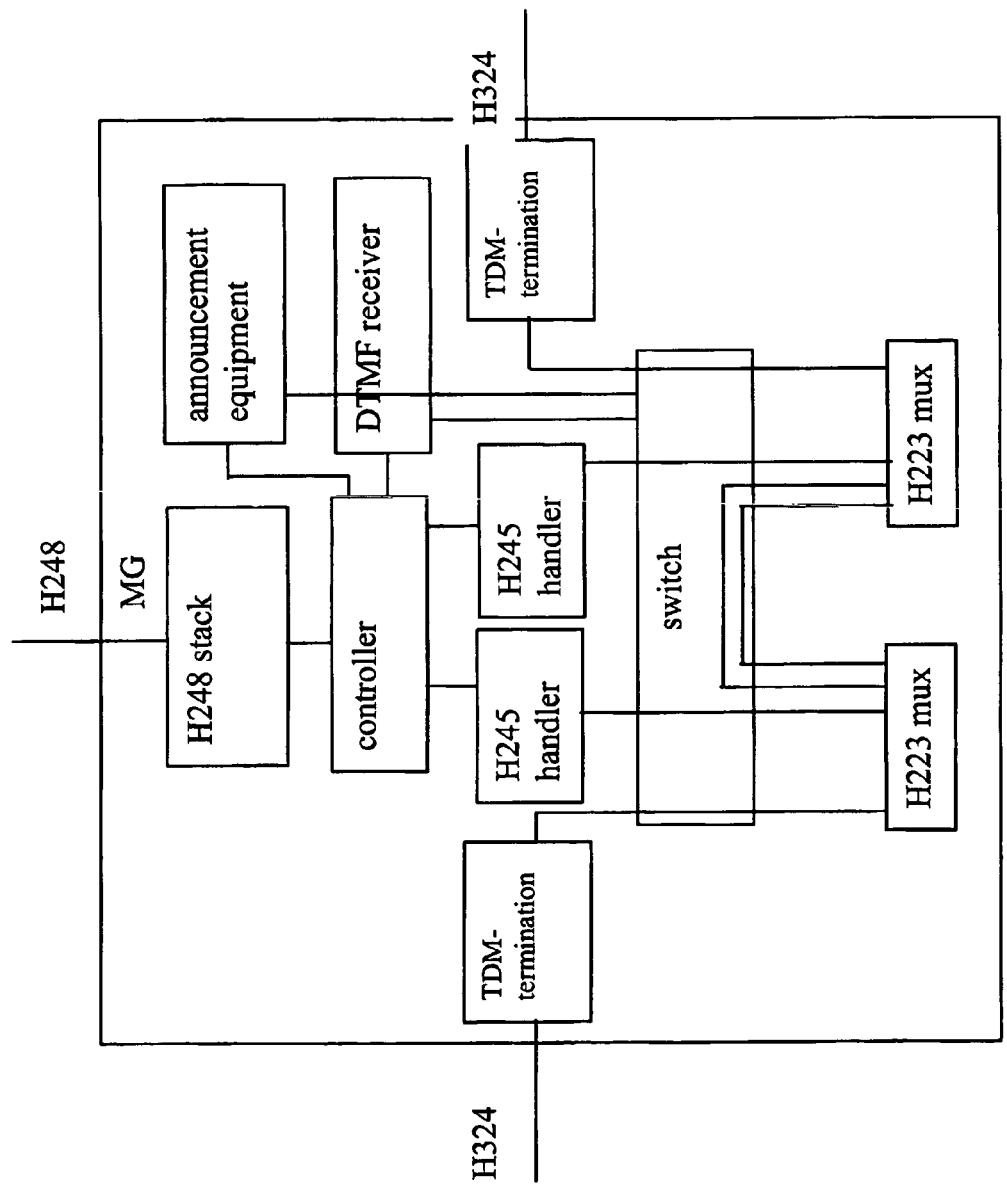
FIG. 2 illustrates a MG architecture of an IN node of the architecture of FIG. 1.

A detailed overview of the Media Gateway ($MG_1$) of the IN network is shown in FIG. 2. Based on information about the call type, i.e. H.324 in the H.248 Add message, and information that DTMF digit detection is requested, the controller within the MG links the H.245 handlers and H.223 multiplexers at the MG into the call, instead of linking-in the normal DTMF receiver. The H.223 multiplexer demultiplexes the H.324 user data stream into media streams and the H.245 control stream. The latter are passed to the H.245 handler. The H.245 handler contains H.245 decoder/encoder and statefull logic to control H.245 signaling. i.e.:

When H.245 userInputIndication (UII) containing the dialed digit is received from a subscriber, the digit is passed up to the H.248 handler. The mechanism to transfer detected digits in H.248 is the same as for a normal voice call. The DTMF digits are passed by the SSP to the SCP, the SCP having the service logic which determines the appropriate actions.

The H.245 handler gathers data relevant to the MG from the H.245 signaling between end-points, e.g. H.223 mux configuration data is transferred in an
H.245 MultiplexentrySend (MES) message in order to ensure that both end-points utilise the same multiplexing algorithm.

H.245 signaling is triggered and suppressed when needed, e.g. if IN-services decides to reroute the call to a new destination whilst media channels are open to an old destination, the H.245 handler must close the channels to the calling party prior to opening channels between the new destination and the calling party.

Figure 3:
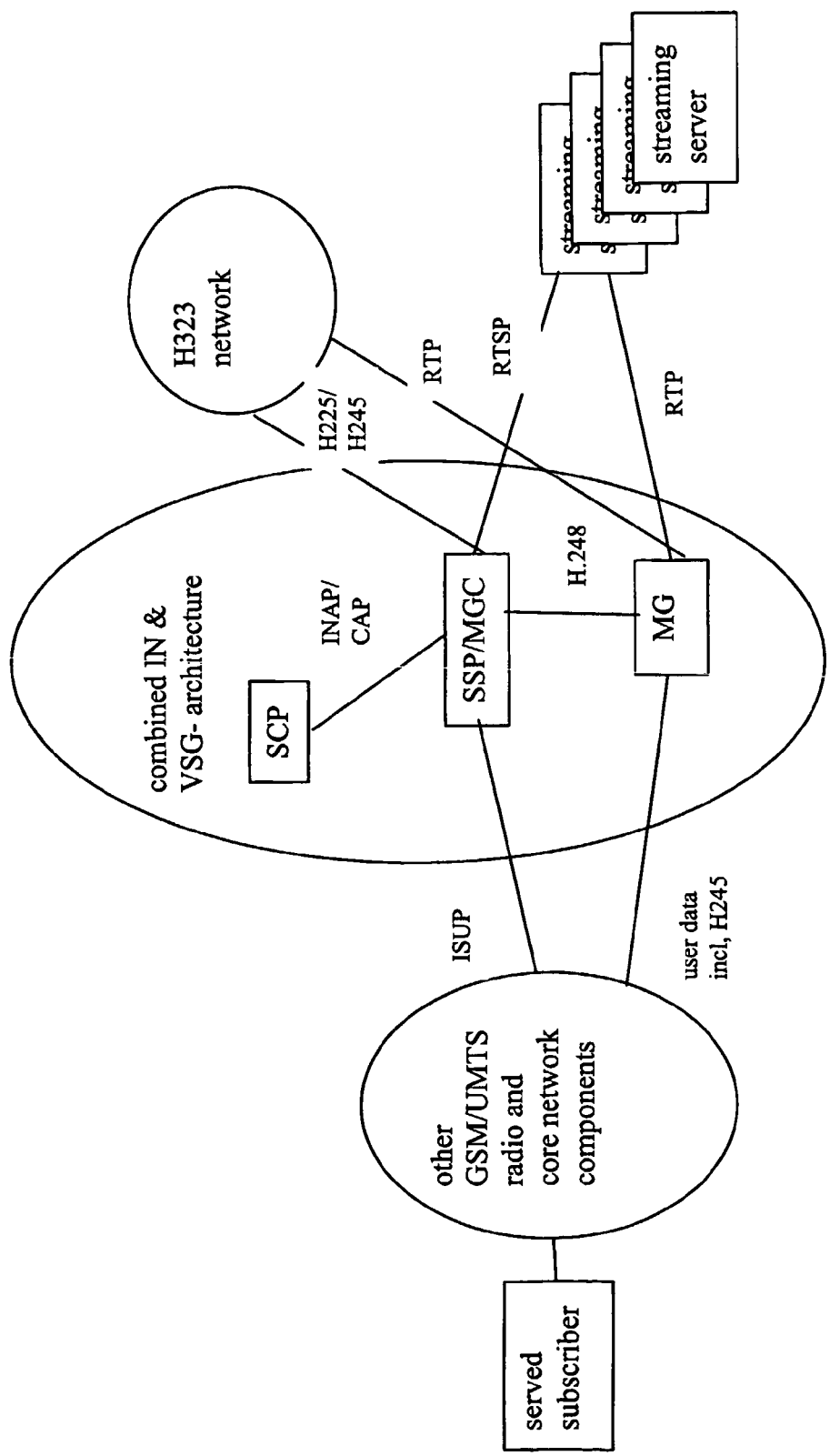
FIG. 3 illustrates an alternative architecture for providing multimedia services to users.

One problem with the approach described above is that separated IN and VSG architectures may create delays, e.g. H.223 multiplexing in $MG_1$. This problem may be solved by combining the IN and VSG into a single node. This makes it possible for the IN to utilize the same resources and the same H.223 demultiplexer as the VSG, which are needed for VSG functions. This approach is illustrated in FIG. 3.

Figure 4:
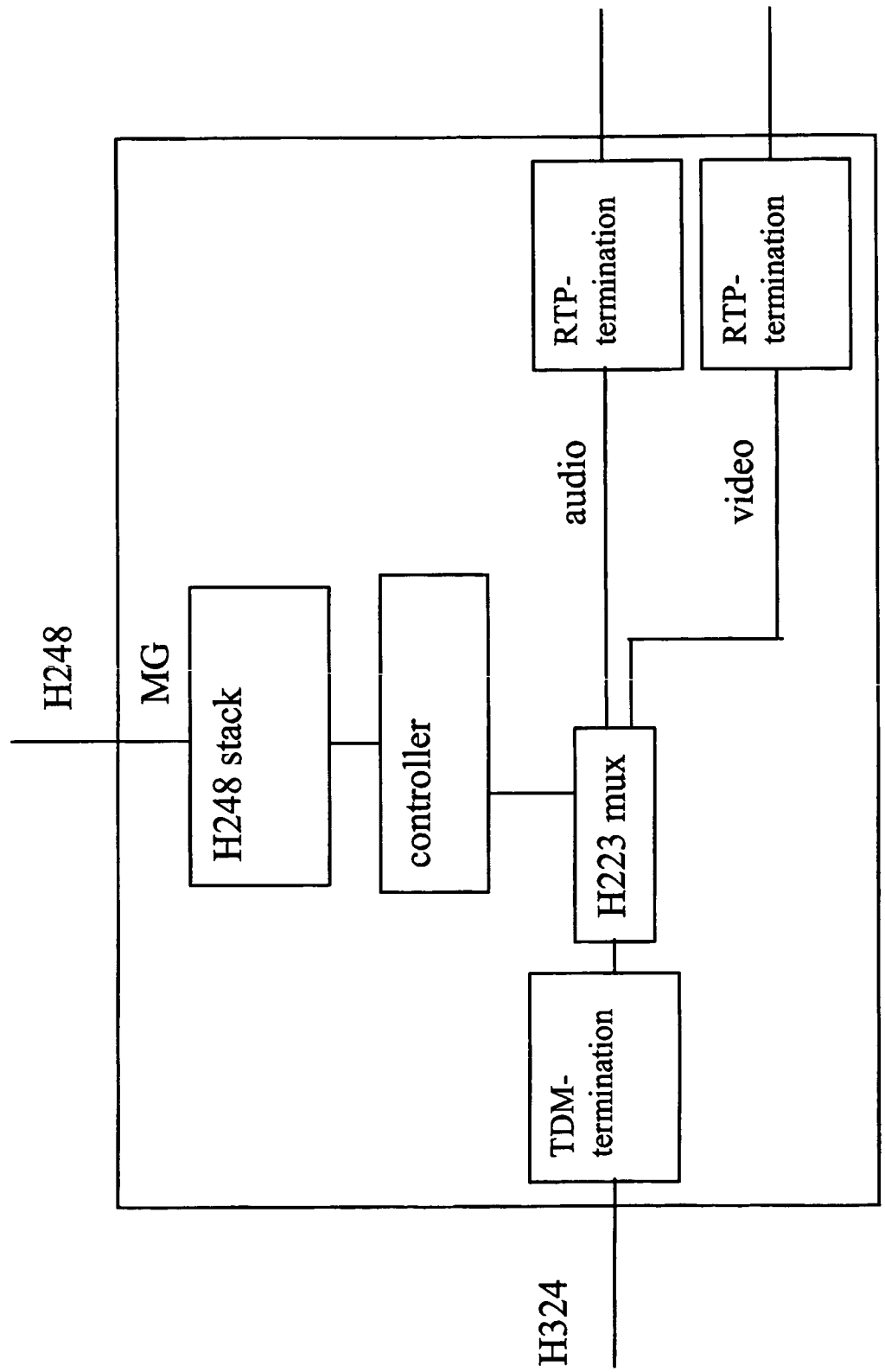
FIG. 4 illustrates a MG architecture of a combined VSG/IN node of the architecture of FIG. 3.

A detailed overview of the MG of the combined IN network/video gateway node is shown in FIG. 4. The architecture is the same as in the normal MG of the VIG/VSG. The H.223 multiplexer within the MG demultiplexes the H.324 user data stream between media streams and the H.245 control stream. Demultiplexing happens according to the configuration parameters received from MGC. Media streams are transferred to RTP handlers and further to an IP network. The H.245 control stream including UII message is transferred via H.248 to MGC. All this happens in the same way as in the normal VIG/VSG.

Figure 5:
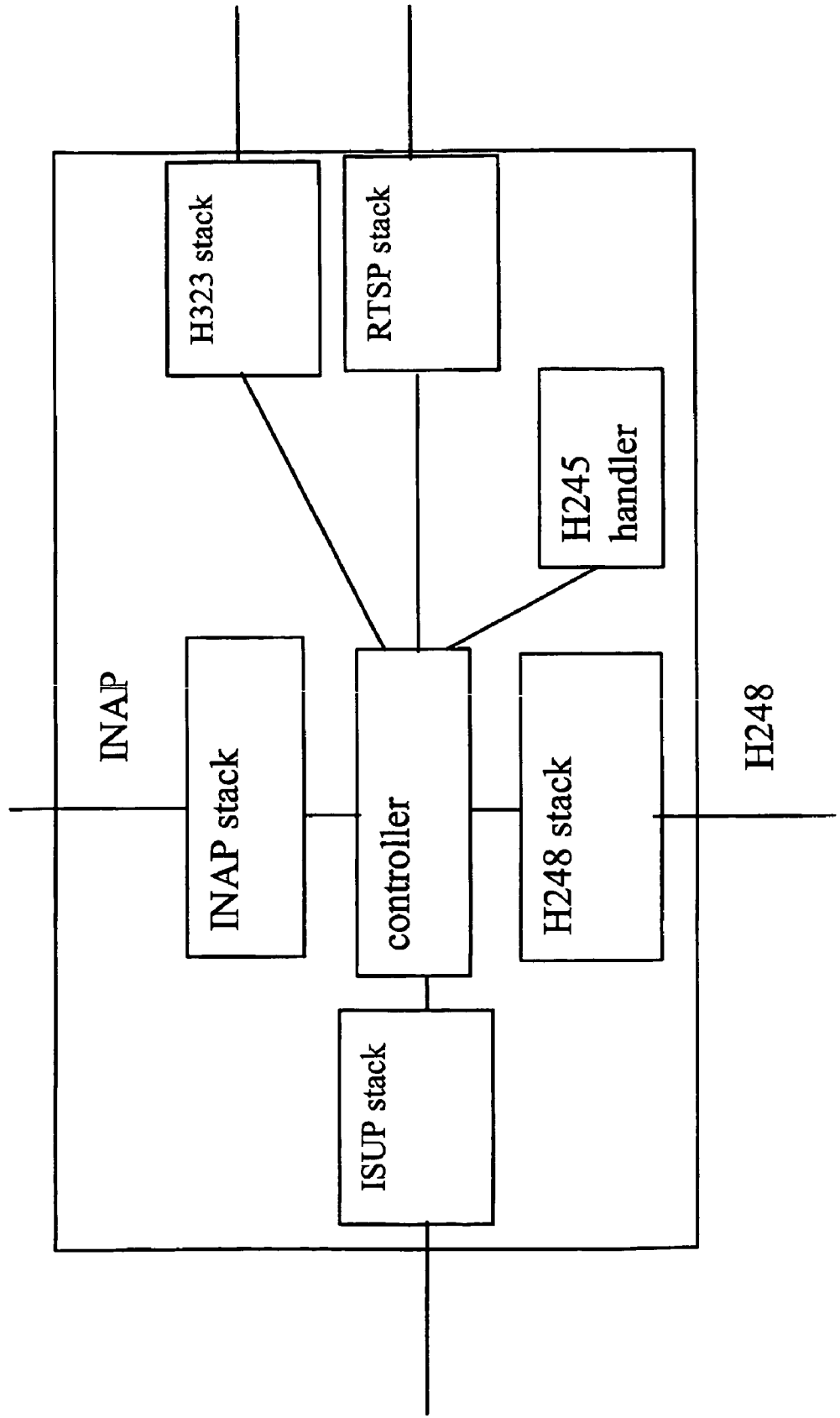
FIG. 5 illustrates a MGC architecture of a combined VSG/IN node of the architecture of FIG. 3.

A detailed overview of the SSP/MGC of the combined IN network/video gateway node is shown in FIG. 5. An H245 handler within the MGC decodes the H245 messages and extracts the H245 UII. These are passed via the a controller and INAP stack from the MGC to the SCP, which processes them as standard DTMF digits using the applicable service logic. The Controller within the SSP/MGC contains logic to reroute the call based on the commands received from the SCP, via INAP. This involves establishing a new RTSP session. Depending on the parameters on stream content (Session Descriptor Protocol, SDP), the controller may need to reopen the channels towards the calling party with new codec parameters with the help of the H.245 handler and modify the codec parameters in the MG.

The architectures described here allow the IN and Internet streaming servers to be combined with the help of the VSG, to provide multimedia intelligence.

Figure 6:
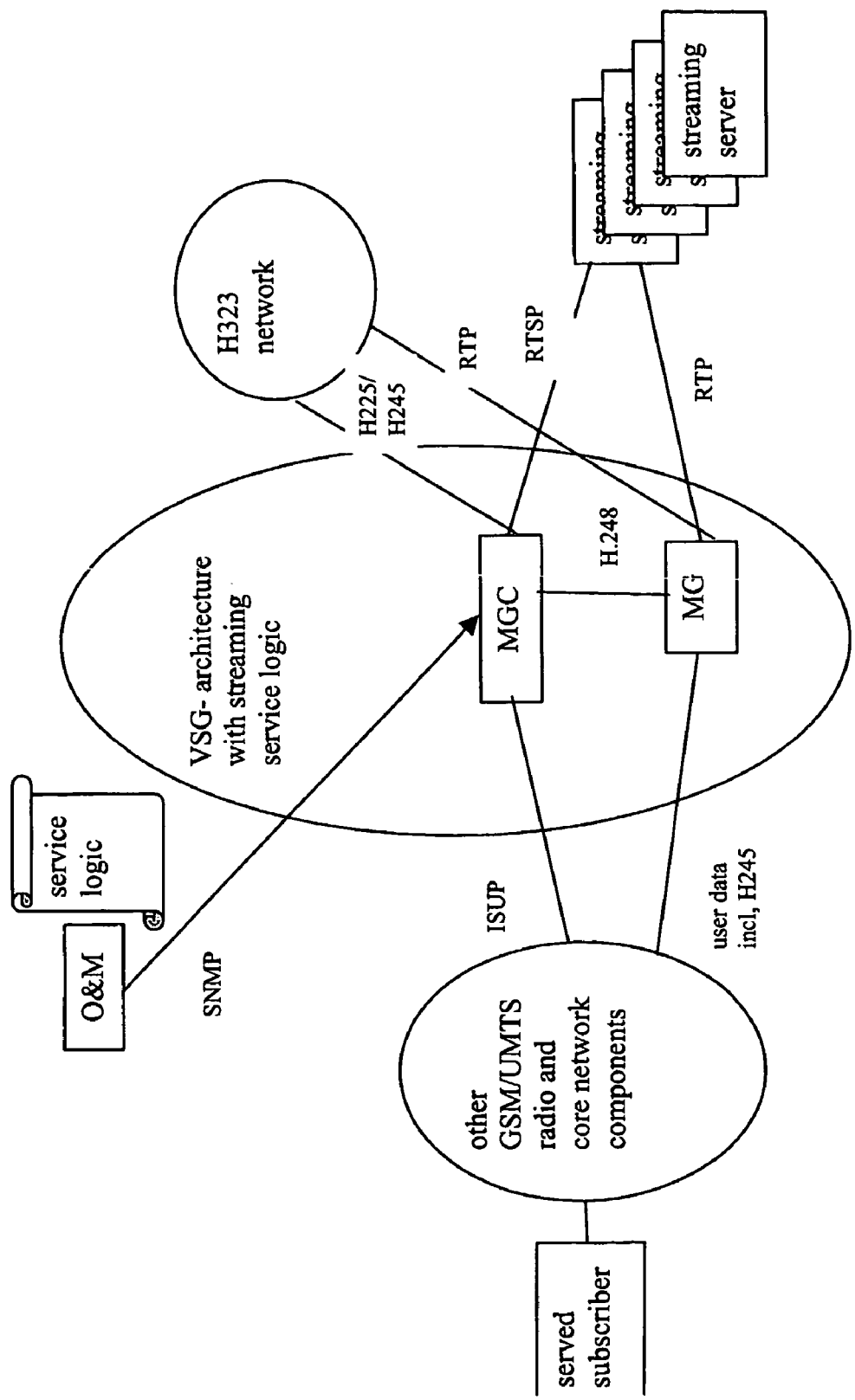
FIG. 6 illustrates a further embodiment of the invention in which service logic for handling DTMF control signals is contained within a service node disposed between a video gateway and a streaming server.

FIG. 6 illustrates a further embodiment of the present invention and which is implemented without the need for an Intelligent Network. In this embodiment, the relevant service logic previously contained in the SSP and SCP is incorporated into the MGC of the video gateway. Using the Simple Network Management Protocol (SNMP), the operation of the MGC is controlled by an Operation and Maintenance (O&M) system.

Figure 7:
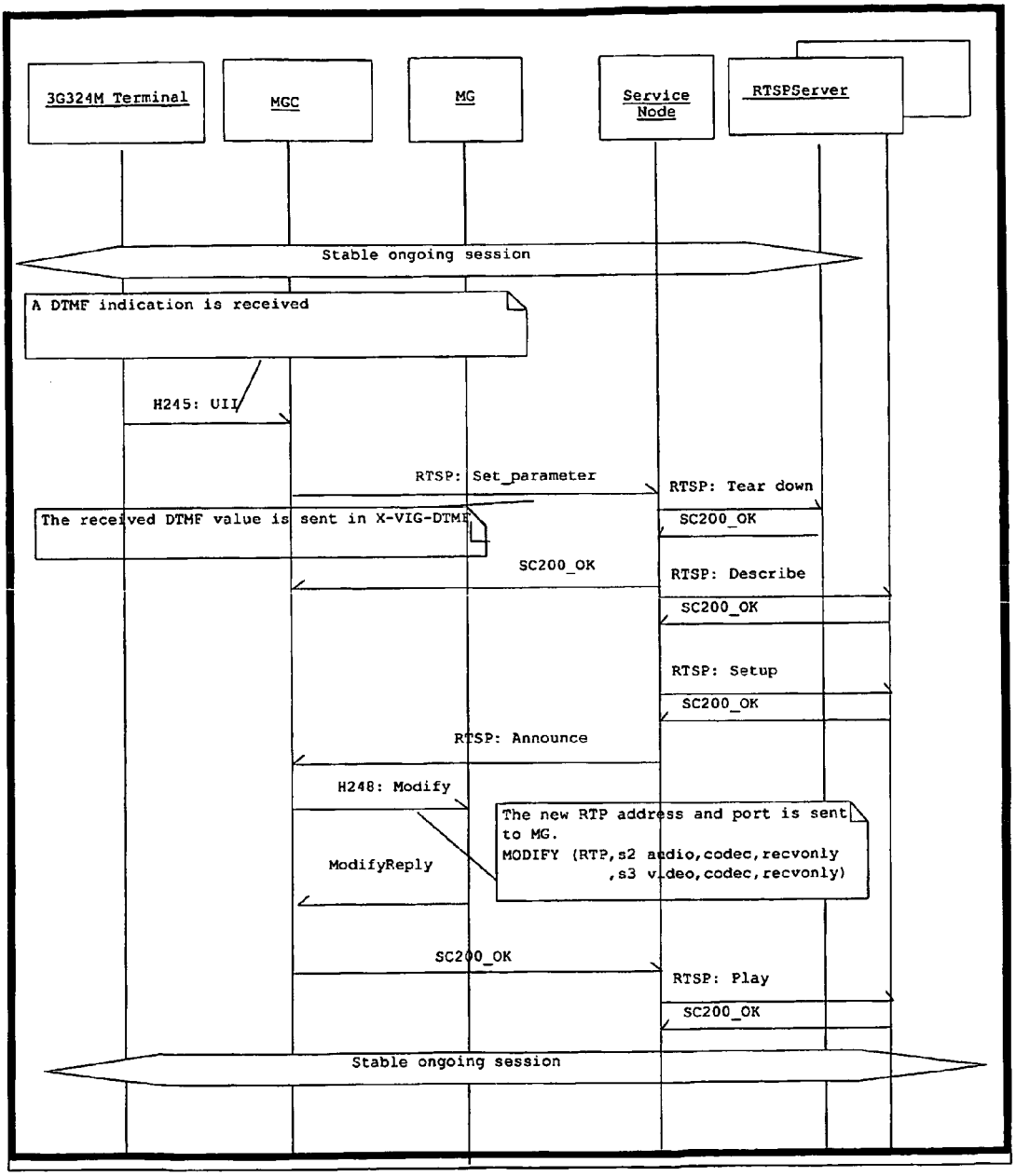
FIG. 7 is a signalling diagram showing signalling associated with the embodiment of FIG. 6.

In a modification to this embodiment, for the streaming gateway scenario, the service logic may be decoupled from the video gateway, and relocated to a node located between the video gateway and the streaming servers. The signalling diagram of FIG. 7 illustrates signalling associated with this modified embodiment. The new service node supports RTSP. In this embodiment, DTMF signals are extracted from the H.245 control messages at the MGC of the video gateway, and are forwarded to the new service node as "X-VIG-DTMF" elements of the RTSP message "Set Parameter". The service node then identifies the appropriate addresses (URLs) of the packet switched servers using the DTMF signals.

This modification may also be applied in other scenarios apart from that of video streaming. Consider for example the following scenarios:
1) A video gateway may be used for 3G-subscribers (using 3G-324M terminals) to connect to IP-based video mail systems. In this scenario the 3G-subscriber can use DTMF signals (i.e. transported as H.245 UII) to control video mail operations, e.g. to watch the next video message. The MGC within the video gateway communicates with a video mail system using H323, which includes H.245, i.e. the video gateway is transparent to H.245 UII messages.
2) The video gateway may interconnect H.324 terminals to the IMS (IP multimedia system, as defined by 3GPP). In this scenario the H.324 subscriber could use DTMF to control IMS services. Thus the actual call could be truly interactive video end-to-end and DTMF could be used for example to control a multiparty video conference (provided by IMS).

It will be appreciated by the person of skill in the art that various modifications may be made to the above described embodiments without departing from the scope of the present invention. For example, the invention may be implemented without the need for a video gateway in the communication path. This might arise when the IN controls calls between two H.324 terminals.

Abbreviations used in the preceding description include:

| | |
|---|---|
| AMR | Adaptive Multi-Rate codec |
| CAMEL | Customized Applications for Mobile network Enhanced Logic |
| CAP | CAMEL Application Part |
| CS | Circuit Switched |
| DTMF | Dual Tone Multi-Frequency |
| GSM | Global System for Mobile communications |
| IMS | IP multimedia system |
| IN | Intelligent Network |
| INAP | Intelligent Network Application Part |
| IP | Internet Protocol |
| ISUP | ISDN User Part |
| MG | Media Gateway |
| MGC | Media Gateway Controller |
| PCM | Pulse Code Modulation |
| PS | Packet Switched |
| RTSP | Real Time Streaming Protocol |
| SCP | Service Control Point |
| SNMP | Simple Network Management Protocol |
| SSP | Service Switching Point |
| TDM | Time Division Multiplexed |
| UMTS | Universal Mobile Telecommunication service |
| URL | Universal Resource Locator |
| VIG | Video Interactive Gateway |
| VSG | Video Streaming Gateway |

The invention claimed is:

1. A method of setting up and/or controlling a multimedia call involving an H.324 enabled user terminal and a circuit switched connection terminating at the user terminal and at a network node, the method comprising:
   sending DTMF control signals over the circuit switched connection within H.245 protocol control messages, data streams being multiplexed onto the circuit switched connection using the H.223 protocol;
   at said network node, demultiplexing the received data stream to recover the DTMF control signals, wherein said network node is a video gateway;
   on the basis of said DTMF control signals, routing or re-routing the connection at an intelligent network node to a data source or mapping the connection to a data source, further comprising
   routing the circuit-switched connection through said Intelligent Network node, the Intelligent Network node initially routing the connection to the video gateway on the basis of caller number, called number, or called or caller party location; and
   at the Intelligent Network node, subsequently re-routing the call to a telephone number located at the same or different video gateway on the basis of a DTMF signal contained in an H.245 control message received at the Intelligent Network Node.

2. A method according to claim 1 and comprising sending the DTMF control signals within H.245 UII messages.

3. A method according to claim 1 and comprising, at the video gateway, extracting H.245 control messages and forwarding these messages to said intelligent network node, the intelligent network node determining, on the basis of a DTMF signal or signals contained within the forwarded H.245 messages, an address of a packet switched data source to which the circuit switched connection should be connected, establishing a packet switched connection to that data source, and relaying the packet switched data to the video gateway.

4. A method according to claim 1, wherein said data source is a peer H.324 or H.232 user terminal.

5. A method according to any claim 1, wherein said data source is a streaming server or video mail server.

6. A method according to claim 1 and comprising mapping a telephone number at which the circuit switched connection is terminated to a Universal Resource Locator identifying said data source.

7. A method according to claim 1, wherein said user terminal is a 3G-324M mobile terminal.

8. A method according to claim 1, wherein said network node is said Intelligent Network node.

9. A method of operating an Intelligent Network node of a communications network, the method comprising receiving DTMF signals contained within H.245 control messages sent from a user terminal over a circuit switched connection, mapping the DTMF signals to associated telephone numbers terminating at a video gateway, and routing or re-routing the connection to the video gateway on the basis of determined telephone numbers.

10. A method of operating a video gateway of a communications network, the method comprising receiving one or more DTMF signals contained within an H.245 control message sent from a user terminal over a circuit switched connection, mapping the DTMF signal(s) to an address of packet switched data sources, and coupling the circuit switched connection to said data source over a packet switched network.

11. A method of operating a video gateway of a communications network, the method comprising terminating a circuit switched connection from an H.324 user terminal, receiving H.245 control messages multiplexed onto said connection using H.223, demultiplexing the H.223 stream to recover H223 messages containing DTMF control signals, and forwarding these H.223 control messages to a service node disposed between the video gateway and a packet switched data source.

12. A method of operating a service node of a communications network, the service node being disposed between a video gateway and a packet switched data source, the method comprising receiving H.245 control messages from the video gateway, recovering from the H.245 control messages DTMF control signals provided by a user terminal, mapping one or more of the DTMF control signals to an address of the data source, receiving data from said data source over a packet switched network and forwarding the data to the video gateway.

13. A method of setting up and/or controlling a multimedia call involving a user terminal and a circuit switched connection between the user terminal and a video gateway, the method comprising:

routing circuit switched related signalling to an Intelligent Network, IN, node, with user initiated DTMF signals being contained within H.245 messages; and at the IN node, detecting H.245 messages containing DTMF signals, and causing the service logic at the IN node to set up and/or control the circuit switched connection to the video gateway in accordance with the received DTMF signals.

14. A method of delivering streaming data over a circuit-switched access network from a packet-switched streaming server to a mobile wireless terminal, the method comprising:

at an Intelligent Network node, selecting a telephone number allocated to a video gateway;

sending a call setup message from said Intelligent Network node to said telephone number and establishing a circuit switched connection between said terminal and the video gateway;

at the video gateway, identifying a packet-switched network address associated with said telephone number; and receiving streaming data from said packet-switched network address, and forwarding the data to said terminal over said circuit-switched connection.

* * * * *

UNITED STATES PATENT AND TRADEMARK OFFICE
CERTIFICATE OF CORRECTION

PATENT NO. : 8,139,560 B2
APPLICATION NO. : 10/573040
DATED : March 20, 2012
INVENTOR(S) : Hynonen et al.

Page 1 of 1

It is certified that error appears in the above-identified patent and that said Letters Patent is hereby corrected as shown below:

In Column 4, Line 34, delete "the a" and insert -- the --, therefor.

In Column 6, Line 23, in Claim 5, delete "any claim 1," and insert -- claim 1, --, therefor.

In Column 6, Line 54, in Claim 11, delete "H223" and insert -- H.223 --, therefor.

Signed and Sealed this
Twenty-sixth Day of June, 2012

David J. Kappos
*Director of the United States Patent and Trademark Office*